United States Patent [19]

Nakamura et al.

[11] Patent Number: 4,759,619

[45] Date of Patent: Jul. 26, 1988

[54] INVERTED TELEPHOTO TYPE WIDE ANGLE LENS SYSTEM WITH A REAR FOCUSING UNIT

[75] Inventors: Akiyoshi Nakamura; Tetsuya Arimoto, both of Sakai, Japan

[73] Assignee: Minolta Camera Kabushiki Kaisha, Osaka, Japan

[21] Appl. No.: 807,308

[22] Filed: Dec. 10, 1985

[30] Foreign Application Priority Data

Dec. 13, 1984 [JP]  Japan ................................ 59-263170

[51] Int. Cl.$^4$ .......................... G02B 13/04; G02B 9/00
[52] U.S. Cl. ....................................... 350/458; 350/463
[58] Field of Search ............... 350/458, 460, 459, 463, 350/461, 462

[56] References Cited

U.S. PATENT DOCUMENTS

| | | | |
|---|---|---|---|
| 3,473,866 | 10/1969 | Kirchhoff | 350/255 |
| 3,884,556 | 5/1975 | Nakagawa | 350/459 |
| 3,981,563 | 9/1976 | Nakamura | 350/458 |
| 4,029,397 | 6/1977 | Yamashita | 350/458 |
| 4,099,649 | 7/1978 | Lawson et al. | 220/439 |
| 4,311,367 | 1/1982 | Mori | 350/461 |
| 4,382,662 | 5/1983 | Tokumaru et al. | 350/459 |

FOREIGN PATENT DOCUMENTS 58-202414 11/1983 Japan .

Primary Examiner—John M. Corbin
Assistant Examiner—Ronald M. Kachmarik
Attorney, Agent, or Firm—Price, Gess & Ubell

[57] ABSTRACT

An improvement of an inverted telephoto type wide angle lens system having, from the object to the image side a front lens group of a negative refractive power which is left stationary upon focusing, and a rear lens group of a positive refractive power which is shiftable for the purpose of focusing is disclosed. The improvement is characterized in that the lens system fulfills the following condition:

$$2.65 < |f_F|/f_R < 7.5$$

wherein $f_F$ represents the focal length of the front lens group, and $f_R$ represents the focal length of the rear lens group.

9 Claims, 5 Drawing Sheets

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

FIG.13
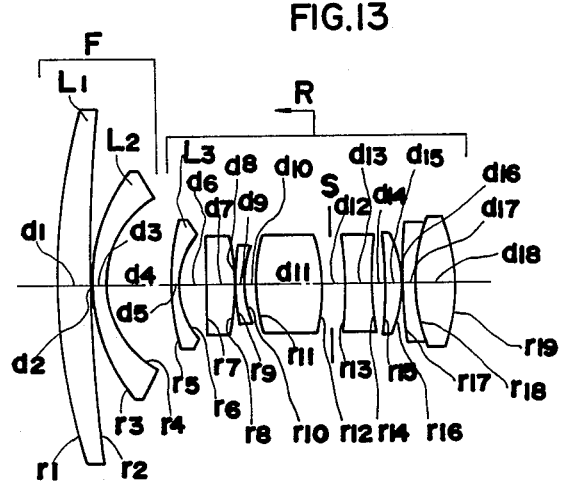
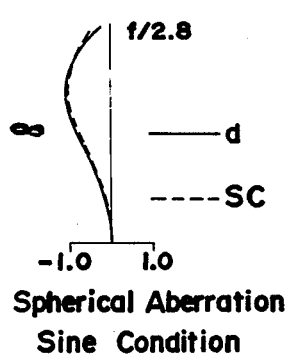
FIG.14a
Spherical Aberration
Sine Condition
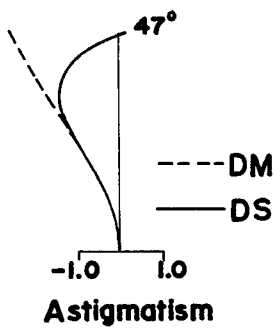
FIG.14b
Astigmatism
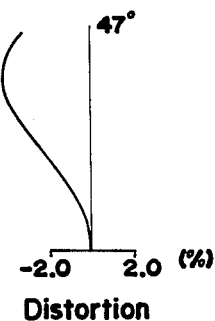
FIG.14c
Distortion
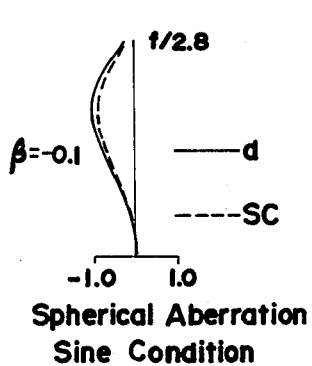
FIG.15a
Spherical Aberration
Sine Condition
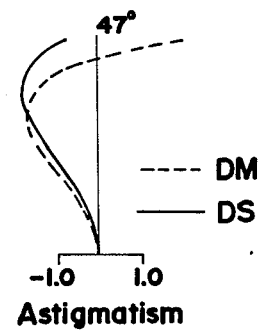
FIG.15b
Astigmatism
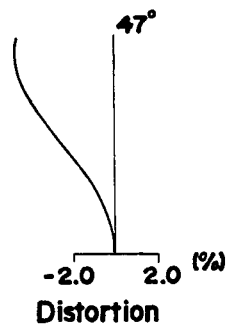
FIG.15c
Distortion

INVERTED TELEPHOTO TYPE WIDE ANGLE LENS SYSTEM WITH A REAR FOCUSING UNIT

BACKGROUND OF THE INVENTION

1. Field of the Invention

The present invention relates to an inverted telephoto type wide angle objective lens system for a camera, and more specifically to an improvement of its focusing system.

2. Description of the Prior Art

In this field of art, the focusing of the objective has been conventionally carried out by means of shifting the whole lens system. It is also known that another focusing system of shifting only a part of the lens system is available in this field of art, such as disclosed in U.S. Pat. Nos. 3,473,866, 4,029,397, 4,099,849, 4,311,367 and Japanese Pat. Appln. Laid Open No. 58-202414.

The prior art is still seeking to provide an inverted telephoto type wide angle lens system of a type in which the focusing is carried out by shifting a rear part of the lens system.

SUMMARY OF THE INVENTION

An object of the present invention is to provide an improved inverted telephoto type wide angle lens system with a rear focusing unit.

Another object of the present invention is to provide a lens system of the above type with a greater aperture ratio.

Still another object of the present invention is to provide a lens system of the above type with a field angle ($2\omega$) of about 84 to 94 degrees and a lens speed of about F 2.8.

Further object of the present invention is to provide a lens system of the above type with aberrations well corrected across the entire focusing range from infinity to the closest distance.

The present invention provides an inverted telephoto type wide angle lens system comprising, from the object to the image side, a front lens group of a negative refractive power which is left stationary upon focusing, and a rear lens group of a positive refractive power which is shiftable for the purpose of focusing, wherein the lens system fulfills the following conditions:

$$2.65 < |f_F|/f_R < 7.5$$

wherein $f_F$ represents the focal length of the front lens group, and $f_R$ represents the focal length of the rear lens group.

According to the present invention, the front lens group includes from the object to the image side a positive meniscus lens convex to the object side and a negative meniscus lens convex to the object side, and the rear lens group includes from the object to the image side a negative meniscus lens convex to the object side and a sub-group of a positive refractive power containing a diaphragm aperture, and wherein the lens system fulfills the following conditions:

$$0.26 < r_a/r_b < 0.50$$

$$3.5 < r_b/r_c < 20$$

$$1.18 < d_a/d_b < 2.5$$

$$0.25f < d_a < 0.55f$$

wherein $r_a$ and $r_b$ represent the radii of curvature of the object side and the image side surfaces of the positive meniscus lens, respectively; $r_c$ represents the radius of curvature of the object side surface of the negative meniscus lens in the front lens group; $d_a$ represents the air space between the front and rear lens groups with the lens system focused in infinity; and $d_b$ represents the air space within the rear lens group located between the negative meniscus lens and the subgroup.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 13 represents a cross sectional view of the lens system according to a fifth embodiment of the present invention;

FIGS. 14a to 14c represent the aberration curves of the fifth embodiment for the infinity focusing; and FIGS. 15a to 15c represent the aberration curves of the fifth embodiment for a close focusing at $\beta = -0.1$.

DETAILED DESCRIPTION OF THE PREFERRED EMBODIMENTS

Figure 1:
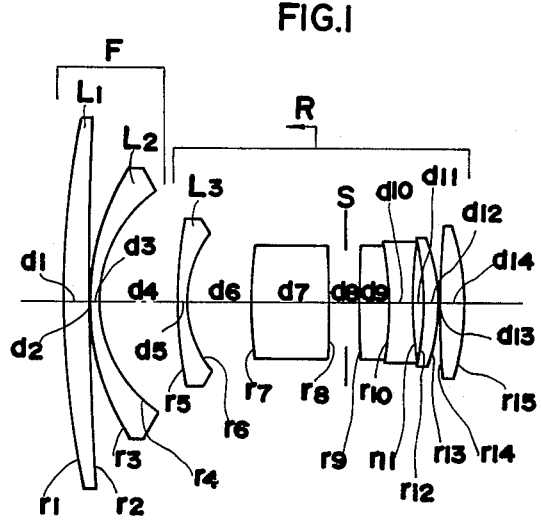
FIG. 1 represents a cross sectional view of the lens system according to a first embodiment of the present invention.
Figure 2A:
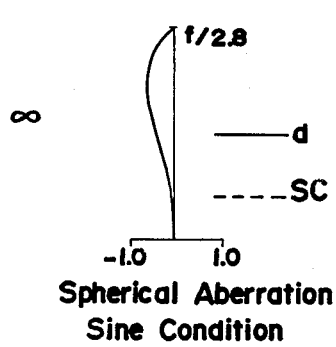
FIGS. 2a to 2c represent aberration curves of the first embodiment for the infinity focusing.
Figure 2B:
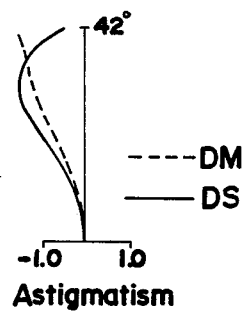
Figure 2C:
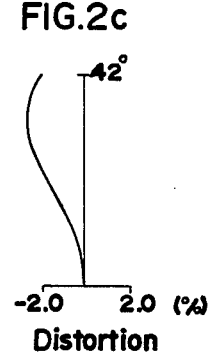
Figure 3A:
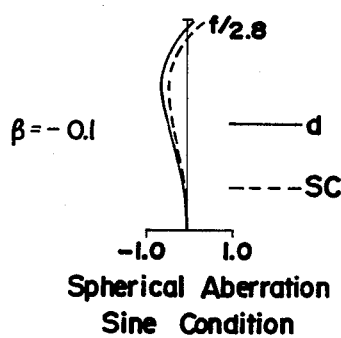
FIGS. 3a to 3c represent aberration curves of the first embodiment for a close focusing at $\beta = -0.1$.
Figure 3B:
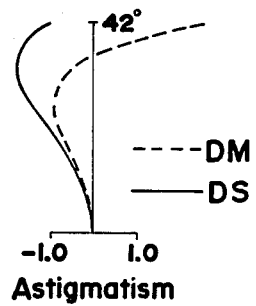
Figure 3C:
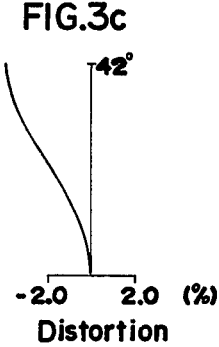

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured compact wide angle lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm SLR camera.

In the drawings, schematic cross sectional views disclose the position of the lens group and lens elements. The individual designation of the radii of curvature and axial distances for each lens element and air space are provided in the accompanying Tables set forth herein, and the schematic cross sectional views of the respective embodiments follow the normal conventions of an object at the left-hand side of the drawing and the image plane at the right-hand side.

As disclosed in FIGS. 1, 4, 7, 10 and 13, the present invention provides an inverted telephoto type wide angle lens system comprising, from the object to the image side, a front lens group (F) of a negative refractive power which is left stationary upon focusing, and a rear lens group (R) of a positive refractive power which is shiftable for the purpose of focusing, wherein the lens system fulfills the following condition:

$$2.65 < |f_F|/f_R < 7.5 \quad (1)$$

wherein $f_F$ represents the focal length of the front lens group (F), and $f_R$ represents the focal length of the rear lens group (R).

The above condition (1) defines a ratio between the focal lengths of the front lens group (F) and the rear lens group (R) to minimize the variation in aberrations which would be caused by shifting only the rear lens group (R) toward the direction of the arrow in the drawings for the purpose of focusing. An inverted telephoto type wide angle lens system generally generates a considerable positive deviation of field curvature if a close focusing is carried out by means of shifting the whole lens system, which results in a failure in maintaining a substantially flat image surface. The above disadvantage has been removed by a field curvature correcting method in which a variable air space formed within the lens system is reduced in synchronism with the shifting of the whole lens system toward the object side. In this method, such a modification is obviously possible when a rear lens group on the image side of the variable air space is only shifted toward the object side to obtain the same result in terms of the focusing and the aberration correction. The present invention relates to an improvement of this rear focus type wide angle lens system, and presents the above condition (1) for providing an inverted telephoto type wide angle lens system of about F 2.8 and $2\omega = 84°$ to 94° with aberrations well corrected across the entire focusing range.

If the lower limit of condition (1) is violated, an excessive negative refractive power of the front lens group (F) would result to cause a negative distortion and an increased astigmatism, as well as a remarkable variation in spherical aberration upon focusing by means of shifting only the rear lens group. These make it impossible to increase the aperture ratio, which is an object of the present invention.

On the other hand, a violation of the upper limit of condition (1) causes an insufficient negative refractive power of the front lens group (F) to fail in obtaining the necessary back focal distance of the lens system. Further, such a greater amount of shift of the rear lens group for focusing is required that the variable air space between the front and rear lens groups is excessively reduced to result in an over-correction of field curvature upon close focusing.

According to another feature of the present invention, the front lens group (F) includes from the object to the image side a positive meniscus lens ($L_1$) convex to the object side and a negative meniscus lens ($L_2$) convex to the object side, and the rear lens group (R) includes from the object to the image side a negative meniscus lens ($L_3$) convex to the object side and a sub-group of a positive refractive power containing a diaphragm aperture (S), and wherein the lens system fulfills the following conditions:

$$0.26 < r_a/r_b < 0.50 \quad (2)$$

$$3.5 < r_b/r_c < 20 \quad (3)$$

$$1.18 < d_a/d_b < 2.5 \quad (4)$$

wherein $r_a$ and $r_b$ represent the radii of curvature of the object side and the image side surfaces of the positive meniscus lens ($L_1$), respectively; $r_c$ represents the radius of curvature of the object side surface of the negative meniscus lens ($L_2$) in the front lens group; $d_a$ represents the air space between the front and rear lens groups with the lens system focused in infinity; and $d_b$ represents the air space within the rear lens group (R) located between the negative meniscus lens ($L_3$) and the succeeding sub-group.

If the lower limit of condition (2) is violated, the positive refractive power of the positive meniscus lens ($L_1$) is so increased that the distortion is excessively corrected and the back focal distance is made insufficient, which are unfavorable to the desired wide field angle. On the other hand, if the upper limit of condition (2) is violated, the positive refractive power of lens ($L_1$) is insufficient to correct the negative aberrations generated by negative meniscus lenses ($L_2$) and ($L_3$).

Condition (3) defines the shape of air space formed between the two meniscus lenses ($L_1$) and ($L_2$) in the front lens group (F). If the lower limit of condition (3) is violated, an optical path length of a light ray emerging from lens ($L_1$) and incident on lens ($L_2$) is shortened due to the reduction of air space between the two meniscus lenses at the marginal portion thereof. Therefore, the aberration correcting function of the positive meniscus lens ($L_1$) is somewhat made ineffective. On the contrary, if the upper limit of condition (3) is violated, the light ray emerges from lens ($L_1$) with an increased angle with respect to the optical axis and travels for a greater optical path length to reach lens ($L_2$). These cause an excessive correction of distortion, an insufficient marginal illumination and variation in astigmatism upon focusing.

Condition (4) defines the location of the negative meniscus lens ($L_3$) upon infinity focusing by the relation between the pair of air spaces $d_a$ and $d_b$ on both side of lens ($L_3$). The violation of the lower limit of condition (4) means a relatively insufficient air space $d_a$, which hardly allows the necessary movement of the rear lens group (R) toward the object side unless the entire size of the lens system is enlarged. On the other hand, if the upper limit of the condition (4) is violated, $d_b$ is relatively reduced to cause the spherical aberration and coma, which makes it difficult to increase the aperture ratio.

Figure 4:
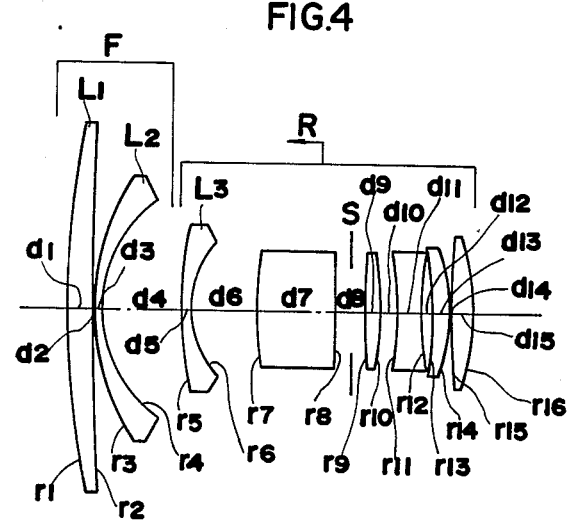
FIG. 4 represents a cross sectional view of the lens system according to a second embodiment of the present invention.
Figure 5A:
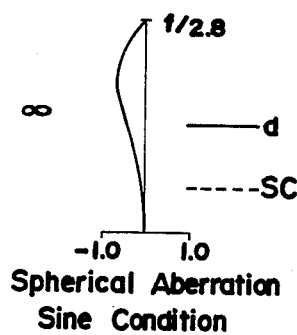
FIGS. 5a to 5c represent aberration curves of the second embodiment for the infinity focusing.
Figure 5B:
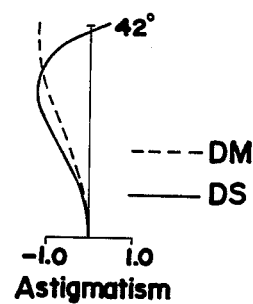
Figure 5C:
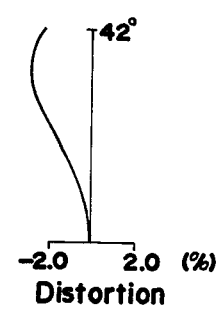
Figure 6A:
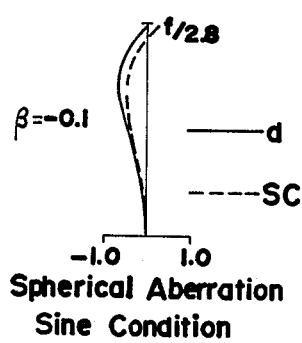
FIGS. 6a to 6c represent aberration curves of the second embodiment for a close focusing at $\beta = -0.1$.
Figure 6B:
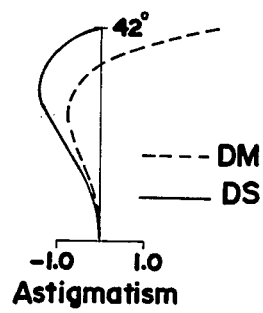
Figure 6C:
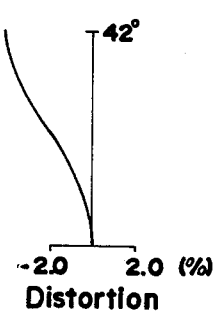
Figure 7:
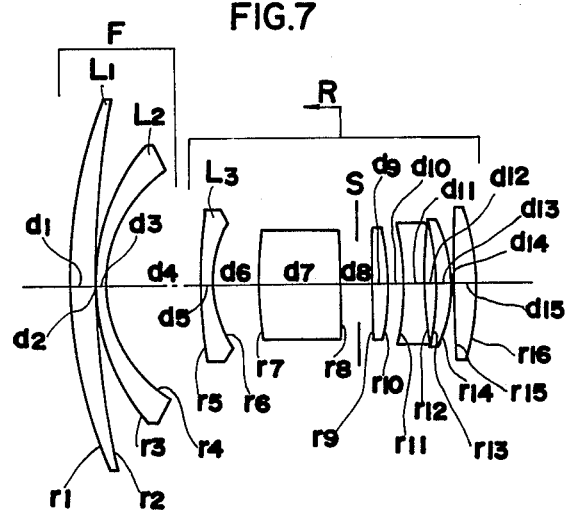
FIG. 7 represents a cross sectional view of the lens system according to a third embodiment of the invention.
Figure 8A:
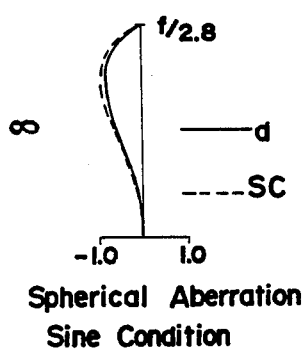
FIGS. 8a to 8c represent the aberration curves of the third embodiment for the infinity focusing.
Figure 8B:
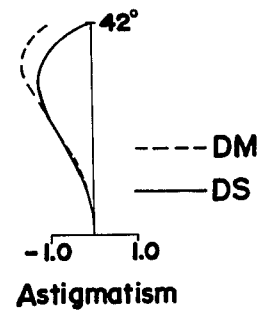
Figure 8C:
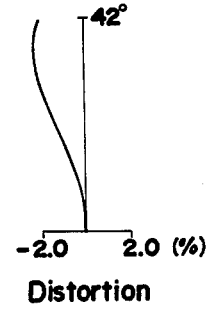
Figure 9A:
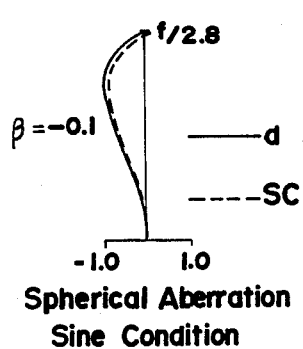
FIGS. 9a to 9c represent the aberration curves of the third embodiment for a close focusing at $\beta = -0.1$.
Figure 9B:
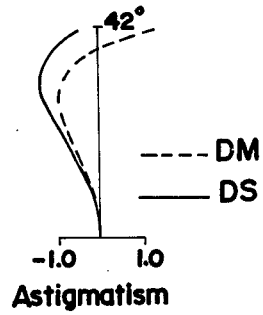
Figure 9C:
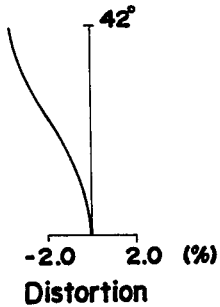

As shown in FIGS. 1, 4 and 7, in the system according to the present invention, the front lens group (F)

includes from the object to the image side a first positive meniscus lens convex to the object side and a second negative meniscus lens convex to the object side, and the rear lens group includes from the object to the image side a third negative meniscus lens convex to the object side, a fourth biconvex lens, a diaphragm aperture, a fifth biconvex lens, a sixth biconcave lens, a seventh positive meniscus lens convex to the image side, and an eighth positive lens. The fifth and sixth lenses may be cemented with each other as in FIG. 1. Or, alternatively the fifth and sixth lenses may be separated from each other by an air space ($d_{10}$) as in FIGS. 4 and 7. In these cases of FIGS. 1, 4 and 7, the lens system fulfills the following conditions according to the present invention:

$$0.26 < r_1/r_2 < 0.50 \quad (2)'$$

$$1.18 < d_4/d_6 < 2.5 \quad (4)'$$

$$0.25f < d_4 < 0.55f \quad (5)$$

$$0.21 < r_7/|r_8| < 0.6 \quad (6)$$

wherein $r_i$ represents the radius of curvature of the i-th surface from the object side; $d_i$ represents the i-th axial distance from the object side with the lens system focused in infinity; and f represents the focal length of the whole lens system upon the infinity focusing.

The above conditions (2)' and (4)' have the same meaning as those in conditions (2) and (4), respectively. Condition (5), as well as condition (4'), defines the air space ($d_4$) which is variable for focusing. If the lower limit of condition (5) is violated, the available photographic distance cannot fulfill the requirement of the closest photographic distance. On the other hand, a violation of the upper limit of condition (5) causes the increase of the diameter of the front lens group to make the lens system bulky.

Condition (6) defines the shape of the biconvex lens in the rear lens group (R) located directly in front of the aperture stop (S) by the relation of the radii of curvatures $r_d$ and $r_e$ of the object side and the image side surfaces. If the lower limit of condition (6) is violated, the refractive power of $r_d$ is made excessive to cause negative coma which is unfavorable to the increase of the aperture ratio. To correct such a negative coma, the lens system has to be made bulky. On the other hand, if the upper limit of condition (6) is violated, the astigmatism caused at $r_e$ hardly allows the increase of the field angle.

Figure 10:
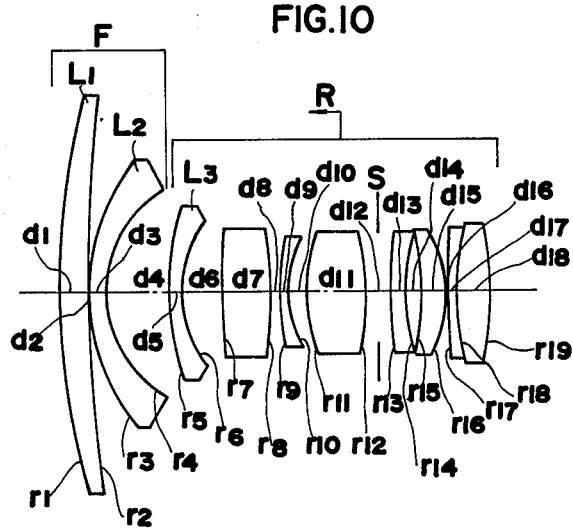
FIG. 10 represents a cross sectional view of the lens system according to a fourth embodiment of the present invention.
Figure 11A:
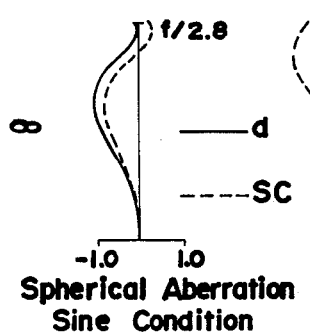
FIGS. 11a to 11c represent aberration curves of the fourth embodiment for the infinity focusing.
Figure 11B:
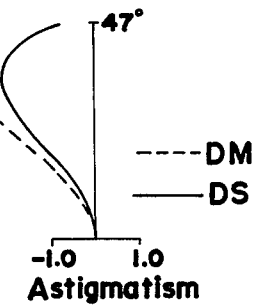
Figure 11C:
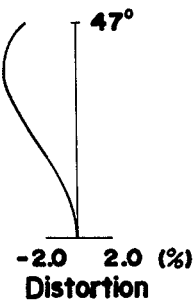
Figure 12A:
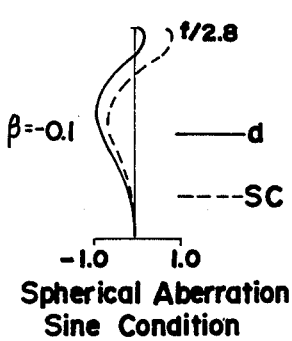
FIGS. 12a to 12c represent aberration curves of the fourth embodiment for a close focusing at $\beta = -0.1$.
Figure 12B:
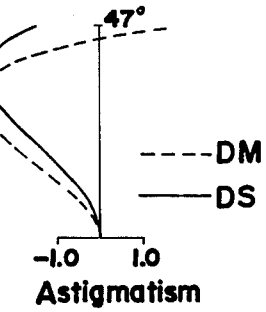
Figure 12C:
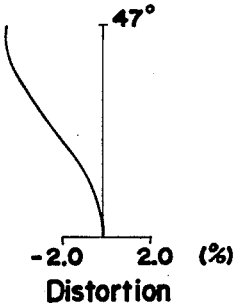

Alternatively, as shown in FIGS. 10 and 13, in the lens system according to the present invention, the front lens group includes from the object to the image side a first positive meniscus lens convex to the object side and a second negative meniscus lens convex to the object side, and the rear lens group includes from the object to the image side a third negative meniscus lens convex to the object side, a fourth positive lens having an image side convex surface, a fifth negative meniscus lens convex to the object side, a sixth biconvex lens, a diaphragm aperture, a seventh negative lens, an eighth positive meniscus lens convex to the image side, a ninth negative meniscus lens and a tenth biconvex lens cemented with the ninth lens.

In the case of FIG. 10, the lens system also fulfills the above mentioned conditions (2)', (4)', and (5). Further, in place of condition (6), the lens system further fulfills the following condition with respect to the biconvex lens in the rear lens group located directly in front of the aperture stop:

$$0.50 < r_{11}/|r_{12}| < 0.85 \quad (6)'$$

The meaning of condition (6)' can be understood in a similar manner to that in condition (6).

The following Tables 1 to 5 disclose, respectively, the first through fourth embodiments of the present invention. In the Tables, f equals the focal length, r is the radius of curvature with respective sub numbers indicating the surfaces from the object to image side along the optical axis, d represents the axial distance and includes both the air spaces and the actual thickness of the lens elements along the optical axis, N equals the refractive index and again, the sub numbers refer to the particular optical element from the object to image side, and finally, $\nu$ equals the Abbe number and the sub numbers refer to the specific lens elements from the object to image side. The air space distance with asterisk (*) in the Tables represents the air space variable upon focusing by means of shifting the rear lens group.

TABLE 1

[Embodiment 1]
F No. = 2.8   $2\omega$ = 84°   f = 100.0

| | | Radius of Curvature | | Axial Distance | Refractive Index (Nd) | | Abbe Number ($\nu$d) |
|---|---|---|---|---|---|---|---|
| F | $r_1$ | 452.582 | | | | | |
| | | | $d_1$ | 11.928 | $N_1$ 1.71060 | $\nu_1$ | 43.25 |
| | $r_2$ | 1563.231 | | | | | |
| | | | $d_2$ | 0.487 | | | |
| | $r_3$ | 117.218 | | | | | |
| | | | $d_3$ | 4.472 | $N_2$ 1.51112 | $\nu_2$ | 60.50 |
| | $r_4$ | 62.786 | | | | | |
| | | | $d_4$ | 38.618* | | | |
| R | $r_5$ | 167.395 | | | | | |
| | | | $d_5$ | 4.743 | $N_3$ 1.51680 | $\nu_3$ | 64.20 |
| | $r_6$ | 48.647 | | | | | |
| | | | $d_6$ | 32.520 | | | |
| | $r_7$ | 135.029 | | | | | |
| | | | $d_7$ | 39.838 | $N_4$ 1.77551 | $\nu_4$ | 37.90 |
| | $r_8$ | −356.346 | | | | | |
| | | | $d_8$ | 14.413 | | | |
| | $r_9$ | 687.824 | | | | | |
| | | | $d_9$ | 15.650 | $N_5$ 1.74100 | $\nu_5$ | 52.67 |
| | $r_{10}$ | −153.659 | | | | | |
| | | | $d_{10}$ | 10.586 | $N_6$ 1.80518 | $\nu_6$ | 25.40 |
| | $r_{11}$ | 148.539 | | | | | |
| | | | $d_{11}$ | 6.504 | | | |
| | $r_{12}$ | −137.606 | | | | | |
| | | | $d_{12}$ | 8.130 | $N_7$ 1.62135 | $\nu_7$ | 61.28 |
| | $r_{13}$ | −74.121 | | | | | |
| | | | $d_{13}$ | 0.487 | | | |
| | $r_{14}$ | 875.879 | | | | | |
| | | | $d_{14}$ | 11.382 | $N_8$ 1.65830 | $\nu_8$ | 58.52 |
| | $r_{15}$ | −115.002 | | | | | |
| | | | $d_{15}$ | | | | |
| | | | $\Sigma d$ = 199.487 | | | | |

*Variable air space ($d_4$ is reduced to 27.573 when $\beta$ = −0.1)
$|f_F|/f_R$ = 3.85, $r_1/r_2$ = 0.29, $r_2/r_3$ = 13.3
$d_4/d_6$ = 1.19, $|r_7/r_8|$ = 0.38

TABLE 2

[Embodiment 2]
F NO. = 2.8   $2\omega$ = 84°   f = 100.0

| | | Radius of Curvature | | Axial Distance | Refractive Index (Nd) | | Abbe Number ($\nu$d) |
|---|---|---|---|---|---|---|---|
| F | $r_1$ | 513.998 | | | | | |
| | | | $d_1$ | 11.928 | $N_1$ 1.71060 | $\nu_1$ | 43.25 |
| | $r_2$ | 1868.913 | | | | | |
| | | | $d_2$ | 0.487 | | | |
| | $r_3$ | 112.337 | | | | | |
| | | | $d_3$ | 4.472 | $N_2$ 1.51112 | $\nu_2$ | 60.50 |

TABLE 2-continued

[Embodiment 2]
F NO. = 2.8  2ω = 84°  f = 100.0

|   |   | Radius of Curvature | | Axial Distance | Refractive Index (Nd) | Abbe Number (νd) |
|---|---|---|---|---|---|---|
|   | $r_4$ | 63.104 | | | | |
|   |   |   | $d_4$ | 38.618* | | |
|   | $r_5$ | 164.899 | | | | |
|   |   |   | $d_5$ | 4.473 | $N_3$ 1.51680 | $\nu_3$ 64.20 |
|   | $r_6$ | 48.365 | | | | |
|   |   |   | $d_6$ | 32.520 | | |
|   | $r_7$ | 145.409 | | | | |
|   |   |   | $d_7$ | 39.838 | $N_4$ 1.77551 | $\nu_4$ 37.90 |
|   | $r_8$ | −652.456 | | | | |
|   |   |   | $d_8$ | 14.413 | | |
|   | $r_9$ | 563.726 | | | | |
|   |   |   | $d_9$ | 8.250 | $N_5$ 1.74100 | $\nu_5$ 52.67 |
| R | $r_{10}$ | −138.385 | | | | |
|   |   |   | $d_{10}$ | 7.968 | | |
|   | $r_{11}$ | −149.947 | | | | |
|   |   |   | $d_{11}$ | 10.586 | $N_6$ 1.80518 | $\nu_6$ 25.40 |
|   | $r_{12}$ | 152.777 | | | | |
|   |   |   | $d_{12}$ | 7.317 | | |
|   | $r_{13}$ | −144.962 | | | | |
|   |   |   | $d_{13}$ | 8.130 | $N_7$ 1.62135 | $\nu_7$ 61.28 |
|   | $r_{14}$ | −76.722 | | | | |
|   |   |   | $d_{14}$ | 0.487 | | |
|   | $r_{15}$ | 715.199 | | | | |
|   |   |   | $d_{15}$ | 11.382 | $N_8$ 1.65830 | $\nu_8$ 58.52 |
|   | $r_{16}$ | −111.865 | | | | |

Σd = 200.862

*Variable air space ($d_4$ is reduced to 27.728 when β = −0.1)
$|f_F|/f_R = 4.01$, $r_1/r_2 = 0.28$, $r_2/r_3 = 16.6$
$d_4/d_6 = 1.19$, $|r_7/r_8| = 0.22$

TABLE 3

[Embodiment 3]
F No. = 2.8  2ω = 84°  f = 100.0

|   |   | Radius of Curvature | | Axial Distance | Refractive Index (Nd) | Abbe Number (νd) |
|---|---|---|---|---|---|---|
|   | $r_1$ | 236.172 | | | | |
|   |   |   | $d_1$ | 12.602 | $N_1$ 1.71300 | $\nu_1$ 53.93 |
|   | $r_2$ | 491.236 | | | | |
|   |   |   | $d_2$ | 0.487 | | |
| F | $r_3$ | 108.239 | | | | |
|   |   |   | $d_3$ | 4.472 | $N_2$ 1.51112 | $\nu_2$ 60.50 |
|   | $r_4$ | 63.712 | | | | |
|   |   |   | $d_4$ | 46.748* | | |
|   | $r_5$ | 211.394 | | | | |
|   |   |   | $d_5$ | 4.473 | $N_3$ 1.51680 | $\nu_3$ 64.20 |
|   | $r_6$ | 45.182 | | | | |
|   |   |   | $d_6$ | 24.390 | | |
|   | $r_7$ | 177.731 | | | | |
|   |   |   | $d_7$ | 41.870 | $N_4$ 1.77551 | $\nu_4$ 37.90 |
|   | $r_8$ | −379.485 | | | | |
|   |   |   | $d_8$ | 14.413 | | |
|   | $r_9$ | 680.549 | | | | |
|   |   |   | $d_9$ | 8.250 | $N_5$ 1.74100 | $\nu_5$ 52.67 |
|   | $r_{10}$ | −138.380 | | | | |
|   |   |   | $d_{10}$ | 7.962 | | |
| R | $r_{11}$ | −136.141 | | | | |
|   |   |   | $d_{11}$ | 10.586 | $N_6$ 1.80518 | $\nu_6$ 25.40 |
|   | $r_{12}$ | 193.959 | | | | |
|   |   |   | $d_{12}$ | 6.504 | | |
|   | $r_{13}$ | −126.253 | | | | |
|   |   |   | $d_{13}$ | 8.130 | $N_7$ 1.62135 | $\nu_7$ 61.28 |
|   | $r_{14}$ | −68.525 | | | | |
|   |   |   | $d_{14}$ | 0.487 | | |
|   | $r_{15}$ | 2278.007 | | | | |
|   |   |   | $d_{15}$ | 12.195 | $N_8$ 1.64050 | $\nu_8$ 60.08 |
|   | $r_{16}$ | −97.515 | | | | |

Σd = 203.567

*Variable air space ($d_4$ is reduced to 36.073 when β = −0.1)
$|f_F|/f_R = 6.65$, $r_1/r_2 = 0.48$, $r_2/r_3 = 4.54$
$d_4/d_6 = 1.92$, $|r_7/r_8| = 0.47$

TABLE 4

[Embodiment 4]
F No. = 2.8  2ω = 94°  f = 100.0

|   |   | Radius of Curvature | | Axial Distance | Refractive Index (Nd) | Abbe Number (νd) |
|---|---|---|---|---|---|---|
|   | $r_1$ | 392.924 | | | | |
|   |   |   | $d_1$ | 18.590 | $N_1$ 1.61800 | $\nu_1$ 63.45 |
|   | $r_2$ | 982.308 | | | | |
|   |   |   | $d_2$ | 0.585 | | |
| F | $r_3$ | 119.360 | | | | |
|   |   |   | $d_3$ | 8.220 | $N_2$ 1.69680 | $\nu_2$ 56.47 |
|   | $r_4$ | 66.364 | | | | |
|   |   |   | $d_4$ | 36.098* | | |
|   | $r_5$ | 160.037 | | | | |
|   |   |   | $d_5$ | 6.029 | $N_3$ 1.69680 | $\nu_3$ 56.47 |
|   | $r_6$ | 58.671 | | | | |
|   |   |   | $d_6$ | 24.390 | | |
|   | $r_7$ | 360.852 | | | | |
|   |   |   | $d_7$ | 28.327 | $N_4$ 1.70055 | $\nu_4$ 27.58 |
|   | $r_8$ | −414.858 | | | | |
|   |   |   | $d_8$ | 5.478 | | |
|   | $r_9$ | 146.388 | | | | |
|   |   |   | $d_9$ | 4.878 | $N_5$ 1.77250 | $\nu_5$ 49.77 |
|   | $r_{10}$ | 60.568 | | | | |
|   |   |   | $d_{10}$ | 10.210 | | |
|   | $r_{11}$ | 84.759 | | | | |
|   |   |   | $d_{11}$ | 35.429 | $N_6$ 1.62012 | $\nu_6$ 49.65 |
| R | $r_{12}$ | −145.130 | | | | |
|   |   |   | $d_{12}$ | 13.302 | | |
|   | $r_{13}$ | 300.042 | | | | |
|   |   |   | $d_{13}$ | 8.098 | $N_7$ 1.80518 | $\nu_7$ 25.43 |
|   | $r_{14}$ | 111.728 | | | | |
|   |   |   | $d_{14}$ | 10.732 | | |
|   | $r_{15}$ | −135.383 | | | | |
|   |   |   | $d_{15}$ | 13.659 | $N_8$ 1.60000 | $\nu_8$ 64.38 |
|   | $r_{16}$ | −65.542 | | | | |
|   |   |   | $d_{16}$ | 0.585 | | |
|   | $r_{17}$ | 678.366 | | | | |
|   |   |   | $d_{17}$ | 5.024 | $N_9$ 1.80518 | $\nu_9$ 25.43 |
|   | $r_{18}$ | 168.536 | | | | |
|   |   |   | $d_{18}$ | 19.512 | $N_{10}$ 1.60000 | $\nu_{10}$ 64.38 |
|   | $r_{19}$ | −191.708 | | | | |

Σd = 249.146

*Variable air space ($d_4$ is reduced to 24.361 when β = −0.1)
$|f_F|/f_R = 2.8$, $r_1/r_2 = 0.4$, $r_2/r_3 = 8.23$
$d_4/d_6 = 1.48$, $|r_{11}/r_{12}| = 0.58$

TABLE 5

[Embodiment 5]
F No. = 2.8  2ω = 94°  f = 100.0

|   |   | Radius of Curvature | | Axial Distance | Refractive Index (Nd) | Abbe Number (νd) |
|---|---|---|---|---|---|---|
|   | $r_1$ | 438.335 | | | | |
|   |   |   | $d_1$ | 24.397 | $N_1$ 1.51680 | $\nu_1$ 64.20 |
|   | $r_2$ | 1229.755 | | | | |
|   |   |   | $d_2$ | 0.586 | | |
| F | $r_3$ | 124.948 | | | | |
|   |   |   | $d_3$ | 9.759 | $N_2$ 1.61800 | $\nu_2$ 63.45 |
|   | $r_4$ | 65.468 | | | | |
|   |   |   | $d_4$ | 46.745* | | |
|   | $r_5$ | 152.654 | | | | |
|   |   |   | $d_5$ | 6.343 | $N_3$ 1.69680 | $\nu_3$ 56.47 |
|   | $r_6$ | 59.188 | | | | |
|   |   |   | $d_6$ | 19.518 | | |
|   | $r_7$ | ∞ | | | | |
|   |   |   | $d_7$ | 19.518 | $N_4$ 1.68300 | $\nu_4$ 31.52 |
|   | $r_8$ | −574.053 | | | | |
|   |   |   | $d_8$ | 1.610 | | |
|   | $r_9$ | 215.886 | | | | |
|   |   |   | $d_9$ | 5.855 | $N_5$ 1.78560 | $\nu_5$ 42.81 |
|   | $r_{10}$ | 71.298 | | | | |
|   |   |   | $d_{10}$ | 8.149 | | |
| R | $r_{11}$ | 105.621 | | | | |
|   |   |   | $d_{11}$ | 48.794 | $N_6$ 1.83400 | $\nu_6$ 37.05 |
|   | $r_{12}$ | −139.318 | | | | |
|   |   |   | $d_{12}$ | 15.761 | | |
|   | $r_{13}$ | −710.544 | | | | |
|   |   |   | $d_{13}$ | 19.518 | $N_7$ 1.84666 | $\nu_7$ 23.83 |

TABLE 5-continued

[Embodiment 5]
F No. = 2.8  2ω = 94°  f = 100.0

| Radius of Curvature | | Axial Distance | | Refractive Index (Nd) | | Abbe Number (νd) |
|---|---|---|---|---|---|---|
| $r_{14}$ | 199.316 | | | | | |
| | | $d_{14}$ | 8.783 | | | |
| $r_{15}$ | −630.648 | | | | | |
| | | $d_{15}$ | 13.175 | $N_8$ | 1.61800 $\nu_8$ | 63.45 |
| $r_{16}$ | −86.273 | | | | | |
| | | $d_{16}$ | 0.586 | | | |
| $r_{17}$ | 544.965 | | | | | |
| | | $d_{17}$ | 7.319 | $N_9$ | 1.83400 $\nu_9$ | 37.05 |
| $r_{18}$ | 100.297 | | | | | |
| | | $d_{18}$ | 30.741 | $N_{10}$ | 1.51728 $\nu_{10}$ | 69.68 |
| $r_{19}$ | −126.602 | | | | | |
| | | Σd = 287.156 | | | | |

*Variable air space ($d_4$ is reduced to 35.047 when $\beta = -0.1$)
$f_F/f_R = 2.71$, $r_1/r_2 = 0.36$ $r_2/r_3 = 9.84$
$d_4/d_6 = 2.39$ $|r_{11}/r_{12}| = 0.76$ As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by these specific embodiments, but only by the scope and spirit of the appended claims.

What is claimed is:

1. An inverted telephoto type wide angle lens system comprising from the object to the image side:
   a front lens group of a negative refractive power which is left stationary upon focusing; and
   a rear lens group of a positive refractive power which is shiftable for the purpose of focusing, wherein the lens system fulfills the following condition:

$$2.65 < |f_F|/f_R < 7.5$$

wherein $f_F$ represents the focal length of the front lens group, and $f_R$ represents the focal length of the rear lens group.

2. The invention of claim 1, wherein the front lens group includes from the object to the image side a positive meniscus lens convex to the object side and a negative meniscus lens convex to the object side, and the rear lens group includes from the object to the image side a negative meniscus lens convex to the object side and a sub-group of a positive refractive power containing a diaphragm aperture, and wherein the lens system fulfills the following conditions:

$$0.26 < r_a/r_b < 0.50$$

$$3.5 < r_b/r_c < 20$$

$$1.18 < d_a/d_b < 2.5$$

wherein $r_a$ and $r_b$ represent the radii of curvature of the object side and the image side surfaces of the positive meniscus lens, respectively; $r_c$ represents the radius of curvature of the object side surface of the negative meniscus lens in the front lens group; $d_a$ represents the air space between the front and rear lens groups with the lens system focused in infinity; and $d_b$ represents the air space within the rear lens group located between the negative meniscus lens and the subgroup.

3. The invention of claim 1, wherein the front lens group includes from the object to the image side a first positive meniscus lens convex to the object side and a second negative meniscus lens convex to the object side, and the rear lens group includes from the object to the image side a third negative meniscus lens convex to the object side, a fourth biconvex lens, a diaphragm aperture, a fifth biconvex lens, a sixth biconcave lens, a seventh positive meniscus lens convex to the image side, and a eighth positive lens, and wherein the lens system fulfills the following conditions:

$$0.26 < r_1/r_2 < 0.50$$

$$1.18 < d_4/d_6 < 2.5$$

$$0.25f < d_4 < 0.55f$$

$$0.21 < r_7/|r_8| < 0.6$$

wherein $r_i$ represents the radius of curvature of the i-th surface from the object side; $d_i$ represents the i-th axial distance from the object side with the lens system focused in infinity; and f represents the focal length of the whole lens system upon infinity focusing.

4. The invention of claim 3, wherein the fifth and sixth lenses are cemented with each other.

5. The invention of claim 3, wherein the fifth and sixth lenses are separated from each other by an air space.

6. The invention of claim 1, wherein the front lens group includes from the object to the image side a first positive meniscus lens convex to the object side and a second negative meniscus lens convex to the object side, and the rear lens group includes from the object to the image side a third negative meniscus lens convex to the object side, a fourth positive lens having an image side convex surface, a fifth negative meniscus lens convex to the object side, a sixth biconvex lens, a diaphragm aperture, a seventh negative lens, an eighth positive meniscus lens convex to the image side, a ninth negative meniscus lens and a tenth biconvex lens cemented with the ninth lens, and wherein the lens system fulfills the following conditions:

$$0.26 < r_1/r_2 < 0.50$$

$$1.18 < d_4/d_6 < 2.5$$

$$0.25f < d_4 < 0.55f$$

$$0.50 < r_{11}/|r_{12}| < 0.85$$

wherein $r_i$ represents the radius of curvature of the i-th surface from the object side; $d_i$ represents the i-th axial distance from the object side with the lens system focused in infinity; and f represents the focal length of the whole lens system upon infinity focusing.

7. An inverted telephoto type wide angle lens system comprising from the object to the image side:
   a front lens group of a negative refractive power which is left stationary upon focusing; and
   a rear lens group of a positive refractive power, which is shiftable for the purpose of focusing, wherein the front lens group includes from the object to the image side a first positive meniscus lens convex to the object side and a second negative meniscus lens convex to the object side, and the rear lens group includes from the object to the image side a third negative meniscus lens convex to the object side, a fourth biconvex lens, a diaphragm aperture, a fifth biconvex lens, a sixth biconcave lens, a seventh positive meniscus lens convex to the image side, and a eighth positive lens, and wherein the lens system fulfills the following conditions:

$0.26 < r_1/r_2 < 0.50$ $0.18 < d_4/d_6 < 2.5$ $0.25f < d_4 < 0.55f$ $0.21 < r_7/|r_8| < 0.6$ wherein $r_i$ represents the radius of curvature of the i-th surface from the object side; $d_i$ represents the i-th axial distance from the object side with the lens system focused in infinity; and f represents the focal length of the whole lens system upon infinity focusing.

8. An inverted telephoto type wide angle lens system comprising from the object to the image side:
   a front lens group of a negative refractive power which is left stationary upon focusing; and
   a rear lens group of a positive refractive power, which is shiftable for the purpose of focusing, wherein the front lens group includes from the object to the image side a first positive meniscus lens convex to the object side and a second negative meniscus lens convex to the object side, and the rear lens group includes from the object to the image side a third negative meniscus lens convex to the object side, a fourth positive lens having an image side convex surface, a fifth negative meniscus lens convex to the object side, a sixth biconvex lens, a diaphragm aperture, a seventh negative lens, an eighth positive meniscus lens convex to the image side, a ninth negative meniscus lens and a tenth biconvex lens cemented with the ninth lens, and wherein the lens system fulfills the following conditions:

$0.26 < r_1/r_2 < 0.50$ $1.18 < d_4/d_6 < 2.5$ $0.25f < d_4 < 0.55f$ $0.50 < r_{11}/|r_{12}| < 0.85$ wherein $r_i$ represents the radius of curvature of the i-th surface from the object side; $d_i$ represents the i-th axial distance from the object side with the lens system focused in infinity; and f represents the focal length of the whole lens system upon infinity focusing.

9. An inverted telephoto type wide angle lens system having a front lens group F and a rear lens group R comprising the following design parameters:

| | | F No. = 2.8 | $2\omega$ = 84° | f = 100.0 | |
|---|---|---|---|---|---|
| | | Radius of Curvature | Axial Distance | Refractive Index (Nd) | Abbe Number ($\nu d$) |
| F | $r_1$ | 452.582 | | | |
| | | | $d_1$ 11.928 | $N_1$ 1.71060 | $\nu_1$ 43.25 |
| | $r_2$ | 1563.231 | | | |
| | | | $d_2$ 0.487 | | |
| | $r_3$ | 117.218 | | | |
| | | | $d_3$ 4.472 | $N_2$ 1.51112 | $\nu_2$ 60.50 |
| | $r_4$ | 62.786 | | | |
| | | | $d_4$ 38.618* | | |
| R | $r_5$ | 167.395 | | | |
| | | | $d_5$ 4.743 | $N_3$ 1.51680 | $\nu_3$ 64.20 |
| | $r_6$ | 48.647 | | | |
| | | | $d_6$ 32.520 | | |
| | $r_7$ | 135.029 | | | |
| | | | $d_7$ 39.838 | $N_4$ 1.77551 | $\nu_4$ 37.90 |
| | $r_8$ | −356.346 | | | |
| | | | $d_8$ 14.413 | | |
| | $r_9$ | 687.824 | | | |
| | | | $d_9$ 15.650 | $N_5$ 1.74100 | $\nu_5$ 52.67 |
| | $r_{10}$ | −153.659 | | | |
| | | | $d_{10}$ 10.586 | $N_6$ 1.80518 | $\nu_6$ 25.40 |
| | $r_{11}$ | 148.539 | | | |
| | | | $d_{11}$ 6.504 | | |
| | $r_{12}$ | −137.606 | | | |
| | | | $d_{12}$ 8.130 | $N_7$ 1.62135 | $\nu_7$ 61.28 |
| | $r_{13}$ | −74.121 | | | |
| | | | $d_{13}$ 0.487 | | |
| | $r_{14}$ | 875.879 | | | |
| | | | $d_{14}$ 11.382 | $N_8$ 1.65830 | $\nu_8$ 58.52 |
| | $r_{15}$ | −115.002 | | | |
| | | | $d_{15}$ | | |
| | | | $\Sigma d$ = 199.487 | | | wherein * represents the variable air space.

* * * * *